Jan. 24, 1950

R. H. CLARK 2,495,507

ELECTRIC MOTOR STOPPING CONTROL

Filed April 11, 1945

INVENTOR.
ROBERT H. CLARK
BY
Kwis, Hudson, Boughton & Williams
ATTORNEYS

Jan. 24, 1950 R. H. CLARK 2,495,507
ELECTRIC MOTOR STOPPING CONTROL
Filed April 11, 1945 4 Sheets-Sheet 2

INVENTOR.
ROBERT H. CLARK
BY
Kwis, Hudson, Boughton & Williams
ATTORNEYS

INVENTOR.
ROBERT H. CLARK

Patented Jan. 24, 1950

2,495,507

UNITED STATES PATENT OFFICE 2,495,507

ELECTRIC MOTOR STOPPING CONTROL

Robert H. Clark, Solon, Ohio, assignor to The Warner & Swasey Company, Cleveland, Ohio, a corporation of Ohio Application April 11, 1945, Serial No. 587,701

3 Claims. (Cl. 318—275)

1

This invention relates to a machine tool and more particularly to means for stopping the work spindle of the machine tool in a predetermined position.

The principal object of the invention is to provide in a machine tool means for stopping the work spindle in a predetermined position to thus facilitate the loading and unloading of the work pieces.

Another object is to provide in a machine tool means for stopping the work spindle in a predetermined position and which means is positive, accurate and efficient in operation.

A further object is to provide in a machine tool means for stopping the work spindle in a predetermined position and which means normally is so located that the operative parts thereof are idle and hence do not produce noise and are not subject to wear, but which means momentarily moves into operative location to stop the spindle.

Another object is to provide in a machine tool means for stopping the work spindle in a predetermined position and which means includes the provision of imparting a constant slow speed non-working drive to the work spindle just prior to applying a braking action to stop the spindle uniformly each time in a predetermined position.

Another object of the invention is to provide in a machine tool means for stopping the work spindle in a predetermined position and which means includes the provision of imparting a constant slow speed non-working drive to the spindle and with the initiation of said drive automatically effecting movement of the operative parts of said means into operative relationship with the spindle.

Another object of the invention is to provide in a machine tool means for stopping the work spindle in a predetermined position and which means includes the provision that when a working speed is initiated for the spindle the brake is automatically released and the operative parts of said means are moved to their normal inactive position.

Another object of the invention is to provide for use in a machine tool a control device for effecting the stopping of the work spindle in a predetermined position and which device constitutes a unit that can be readily attached or detached from the machine tool.

Further and additional objects and advantages not referred to above will become apparent during the detailed description of an embodiment of the invention which is to follow.

2

Referring to the accompanying drawings illustrating said embodiment of the invention, Fig. 1 is a front elevational view of the headstock of a machine tool such as a lathe and a portion of the bed.

Although the invention will be described in connection with the stopping of a work spindle of a machine tool in predetermined position, it will be understood that the invention can be utilized to stop a tool spindle in predetermined position if so desired.

Figure 1:
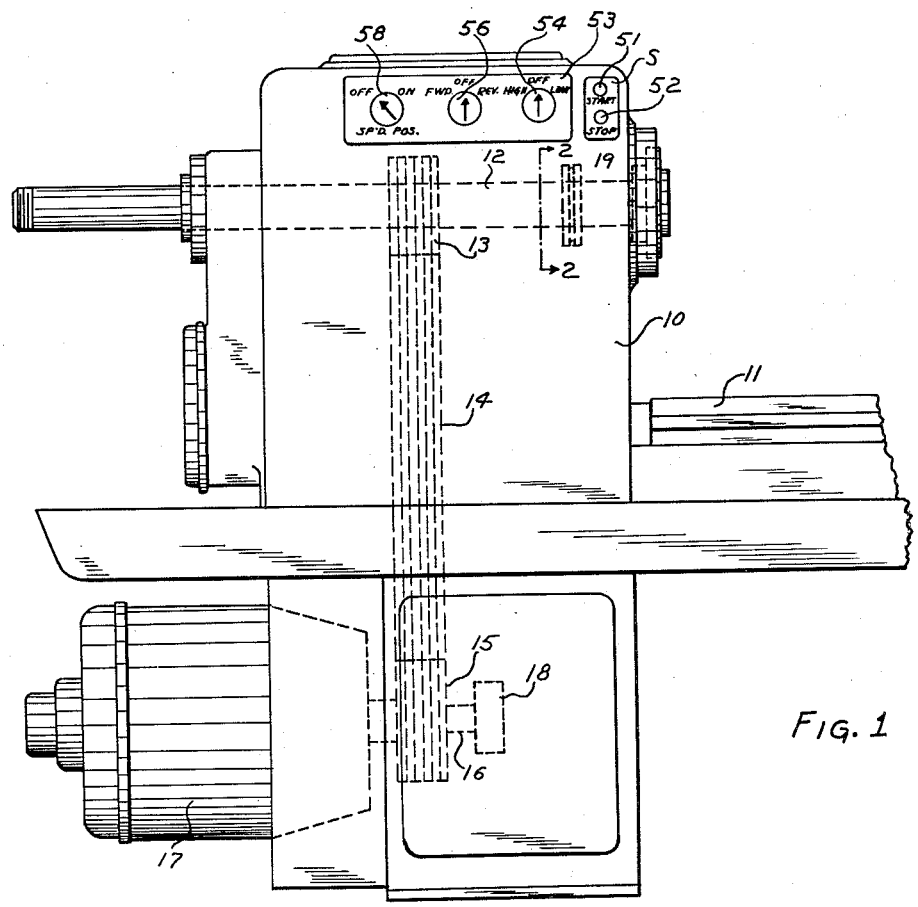

Referring to Fig. 1, 10 is the headstock of a lathe and it is located at one end of the bed 11 and on which bed are the usual tool slides, not shown. The work spindle 12 is rotatably mounted in the headstock and its end adjacent to the bed 11 is provided with a nose which will carry a suitable work holding device (not shown). A pulley 13 is fixed to the spindle 12 and is driven by a series of V-belts 14 which extend around a pulley 15 fixed on the shaft 16 of the driving motor 17 and, in this instance, located in the base of the headstock. The motor shaft 16 is provided with a brake pulley 18, but in Fig. 1 the brake mechanism has been omitted.

Figure 2:
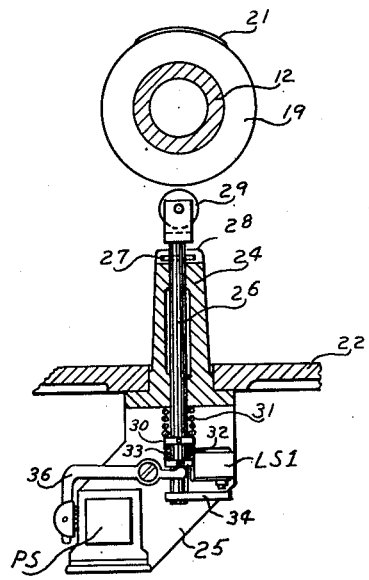
Fig. 2 is a detached view partly in section and partly in elevation through the work spindle and the control device of the spindle positioning means and is taken approximately along the line 2—2 of Fig. 1 looking in the direction of the arrows, the operative parts of the control device being shown in the withdrawn normal inactive position at which time the micrometer switch is open.

The work spindle 12 has mounted thereon a circumferentially adjustable cam ring 19 which can be secured in adjusted position by suitable clamping means 20 and is provided on its periphery with a segmental cam portion 21 (see Figs. 1 and 2). The cam ring 19 is adapted to cooperate with a control device forming part of the means for stopping the spindle in predetermined position, but said device has been omitted in Fig. 1 for purposes of clearness and since it is shown on a larger scale in Figs. 2 to 5, inclusive.

Figure 3:
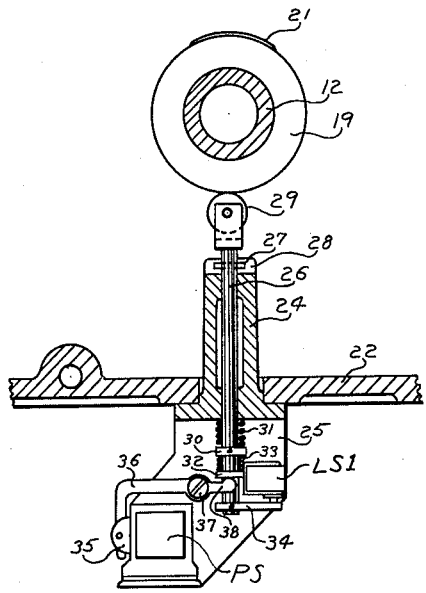
Fig. 3 is a view similar to Fig. 2 but showing the operative parts of the control devices in their active positions and wherein the micrometer switch included in the device is closed.
Figure 4:
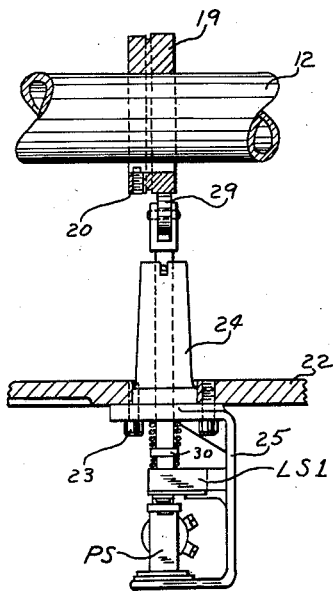
Fig. 4 is a partial section and end elevation of the control device and is taken looking from the right hand side of Fig. 3.

The control device is a unitary structure which is attached to a support 22 within the headstock by means of attaching screws 23 (see Fig. 4). The control device comprises a sleeve portion 24 which extends upwardly through an opening in the support 22 and a bracket portion 25 located below the support 22. The sleeve portion 24 slidably supports a vertically extending rod 26 which is held against turning movement in the sleeve portion by means of a pin 27 carried by the rod and located in a diametral slot 28 in the upper end of the sleeve portion 24 (see Figs. 3 and 4). The upper end of the rod 26 above the pin 27 is in the form of a fork which mounts a roller 29 adapted to contact the periphery of the cam ring 19 and the cam portion 21 when the parts are in active position. The rod 26 below the sleeve portion 24 has fixed thereto a collar 30 while a coil spring 31 is mounted on the rod intermediate said collar and the lower end of the sleeve portion 24 and said spring tends to urge the rod in a downward direction. A collar 32 is freely slidable on the rod 26 below the collar 30 and a coil spring 33 somewhat stronger than the spring 31 is interposed between the collars 30 and 32. The lower end of the rod 26 has fixed thereto a laterally projecting switch actuating arm 34, which in a certain position of the rod 26 engages and moves the plunger of a normally open microswitch LS1 to close said switch. The bracket portion 25 has mounted thereon a solenoid PS. The armature 35 of the solenoid PS is pivotally connected to the downwardly bent end of a lever arm 36 which is pivoted in turn at 37 on the bracket portion 25. The lever 36 beyond the pivot 37 is provided at its free end with a forked portion 38 which straddles the rod 26 below the movable collar 32 and is in contact with said collar.

Figure 5:
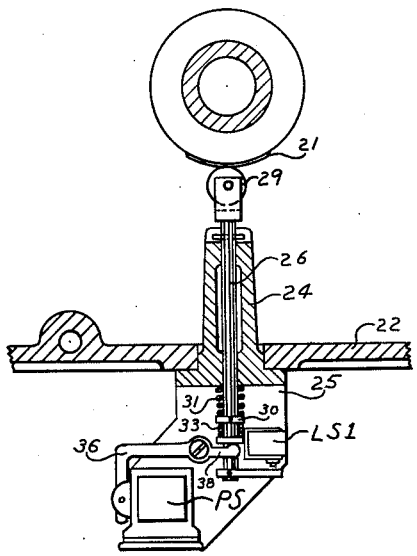
Fig. 5 is a view similar to Fig. 3 and shows the operative parts of the control devices in active position with the micrometer switch open and at which time the brake is applied to stop the spindle.

It will be seen that when the solenoid PS is energized and the armature 35 thereof is moved to rock said lever 36 about the pivot 37 in a counter-clockwise direction the portion 38 of the lever 36 will raise the collar 32 and through the spring 33 and fixed collar 30 will shift the rod 26 upwardly from the position shown in Fig. 2 to the position shown in Fig. 3 and against the action of the spring 31. Therefore the switch actuating arm 34 in moving from the position of Fig. 2 into the position of Fig. 3 moves the actuating plunger of the microswitch LS1 and closes said switch. When the solenoid PS is energized the roller 29 is brought into contact with the periphery of the cam ring 19 as shown in Fig. 3. The solenoid PS remaining energized and the cam ring 19 rotating with the spindle 12 the cam portion 21 thereof is brought into engagement with the roller 29 as indicated in Fig. 5. The engagement of the roller 29 with the cam portion 21 causes the rod 26 to be depressed sufficiently far to move the arm 34 and allow the plunger of the normally open micro switch LS1 to move to switch open position. During this downward movement of the rod 26 the slidable collar 32, since it is in contact with the portion 38 of the lever arm 36, remains stationary and the spring 33 is compressed. In the event that the solenoid PS is energized at such time as the cam portion 21 might be adjacent to the roller 29 then the rod 26 would only move a sufficient distance to engage the roller 29 with the cam portion 21 and the further movement of the lever arm 36 compresses the spring 33 while the switch LS1 remains open. However, as soon as the cam portion 21 moves out of engagement with the roller 29 then the compressed spring 33 moves the rod 26 upwardly to bring the roller 29 into engagement with the periphery of the cam ring 19 as shown in Fig. 3 and at this time the switch LS1 is closed.

Figure 6:
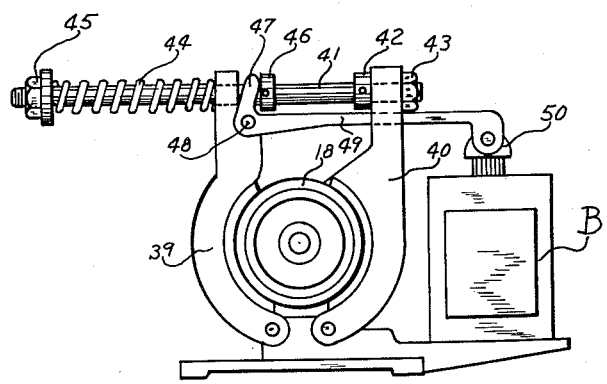
Fig. 6 is an elevational view of the brake used to stop the spindle of the drive motor and in turn the work spindle driven thereby.

In Fig. 6 there is disclosed the brake mechanism which cooperates with the drum or pulley 18 on the motor shaft 16 to stop said shaft and the work spindle 12 driven thereby in a predetermined position. The brake mechanism comprises a pair of pivoted brake shoes 39 and 40 which are normally moved toward each other and into braking relationship with the pulley or drum 18. The brake shoes 39 and 40 carry at their upper ends and remote from their pivots a rod 41 which slides through the upper end of the shoe 39 and is held in the upper end of the brake shoe 40 by means of a collar 42 fixed to the rod on one side of said shoe, and a nut 43 screwed onto the rod on the other side of the shoe. The rod 41 carries a coil spring 44 which has one end abutting the outside of the upper end of the brake shoe 39 and its other end abutting an adjustable nut and washer 45 screwed on the rod. The rod 41 intermediate the upper end of the brake shoe 39 and the collar 42 has fixed thereto a second collar 46 with which cooperates the forked end of the arm 47 of a bell crank lever pivoted at 48 to the brake shoe 39 and having its long arm 49 extending beyond the brake shoe 40 and pivotally connected to the armature 50 of the brake solenoid B.

It will be seen that when the said brake solenoid B is deenergized the armature 50 and the bell crank lever are in position shown in Fig. 6, and at this time the spring 44 acting on the brake shoe 39 and indirectly on the brake shoe 40 through the rod 41 rocks said shoes toward each other and into braking engagement with the pulley or drum 18. When the brake solenoid B is energized and the armature 50 moved inwardly to rock the bell crank lever in a clockwise direction the short arm 47 of said bell crank lever reacts against the collar 46 and since said lever is pivoted to the brake shoe 39, said shoe and the brake shoe 40 are spread apart to non-braking position and this condition holds so long as the solenoid B is energized.

The front of the headstock has mounted thereon, in this instance, the start and stop switch S which includes the start button 51 and the stop button 52. Also mounted on the front of the headstock is a control panel 53 carrying the control 54 for the low and high working speed switches and which control has two operative positions, i. e., high or low, and an intermediate "off" position wherein both switches are open. Similarly, the control 56 for the forward and reverse switches is mounted on the panel 53 and said control is movable to an intermediate "off" position or to either the "fwd" position or the "rev" position. The panel also mounts the control 58 for the spindle positioning switch SP and said control is movable to either an "on" or an "off" position. The switches just above referred to are included in a circuit the diagram of which circuit will be described in conjunction with the description of the manner in which the spindle positioning means functions.

Figure 7:
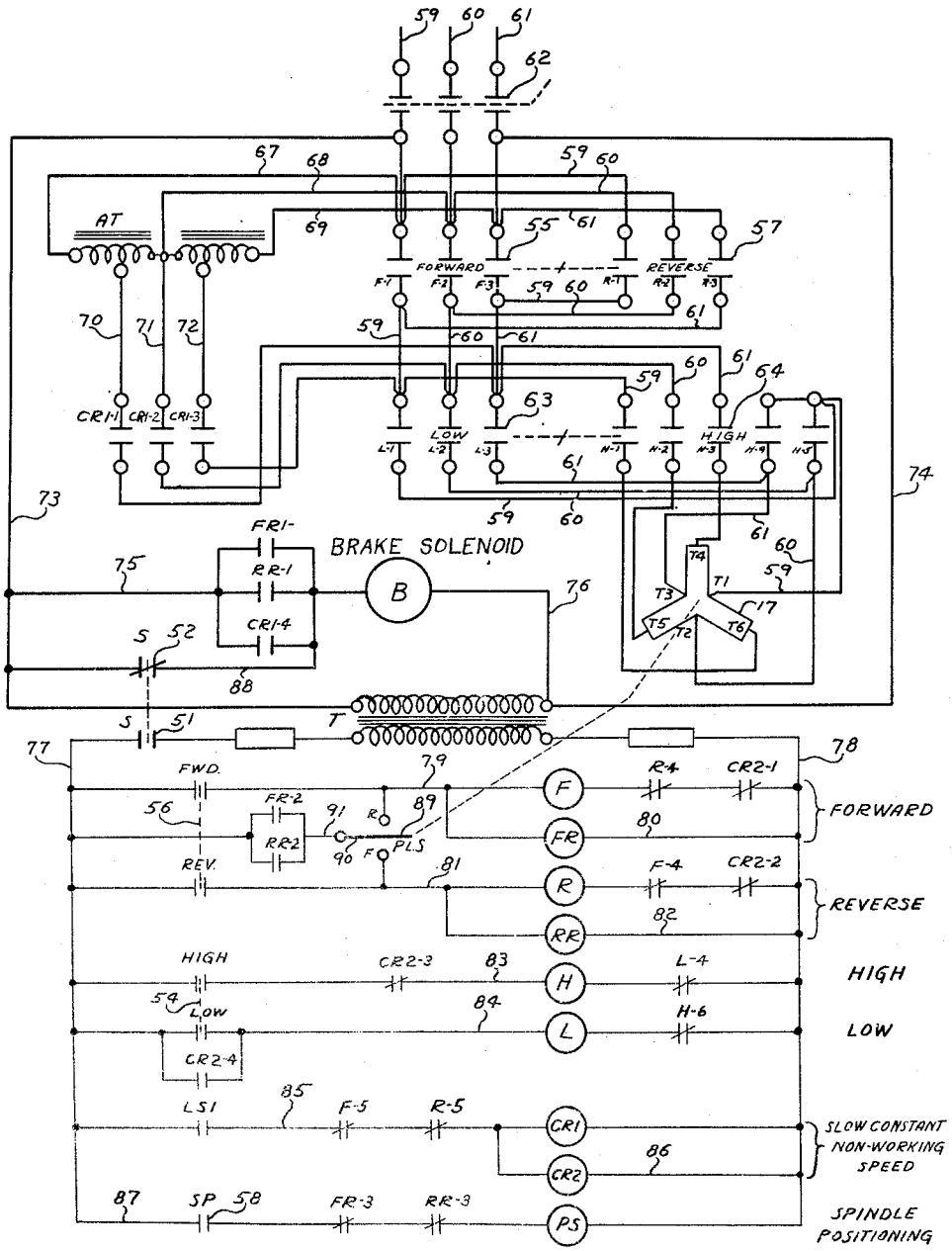
Fig. 7 is a wiring diagram of the control circuits for said motor and the means for stopping the work spindle in predetermined position.
Figure 8:
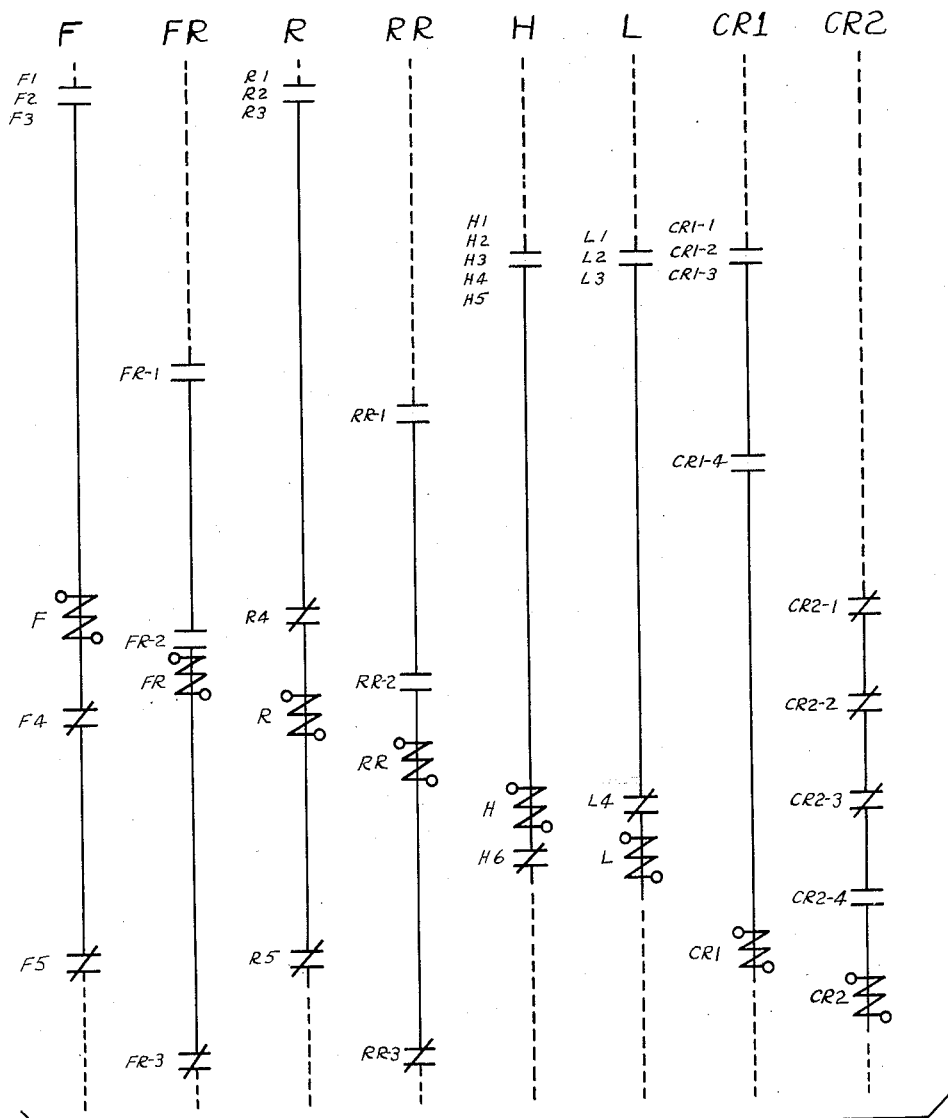
Fig. 8 is a key to the wiring diagram of Fig. 7.

Referring to Fig. 7, the wires 59, 60 and 61 form part of a multiphase circuit from a source of electrical energy and in this circuit is a main disconnect switch indicated diagrammatically at 62 and located preferably on the rear of the machine. The wires 59, 60 and 61 lead through the contacts of the main disconnect switch 62 to the three contacts of the forward contactor 55 controlled by the control member 56 on the panel 53. When the forward contactor 55 is closed then the circuit is extended by the three primary wires 59, 60 and 61 to the three contacts of a low speed contactor 63 from which said three primary wires extend to the three terminals T—1, T—2 and T—3 of the motor 17 and the latter is operated in the forward direction at low working speed.

Assuming that the low working speed contactor 63 is open and the high working speed contactor 64 is closed then the wires 59, 60 and 61 extend, respectively, to the motor terminals T—6, T—5 and T—4 and which terminals in Fig. 7 are the outer terminals. In addition when the high speed contactor 64 is closed the inner terminals T—1, T—2 and T—3 of the motor are connected in an endless circuit by those portions of the wires 59, 60 and 61 leading from the two right hand contacts of the high speed contactor 64, as viewed in Fig. 7, to the three inner terminals T—1, T—2 and T—3 as will be well understood in the art. At such time the motor 17 will be operating at the high working speed.

The wires 59, 60 and 61 also extend to a main reversing contactor 57 which if closed when the main forward contactor 55 is open reverses the wires 59 and 61, it being noted that the wire 60 remains the same. Therefore the opening of the forward contactor 55 and the closing of the reversing contactor 57 will effect either low working speed operation or high working speed operation of the motor 17 in the opposite direction from the operations thereof previously described.

It will be understood that the forward and reverse switches 55 and 57 and the low and high switches 63 and 64 are mechanically interlocked so that only one or the other switch of each pair can be closed at a time, as is well known in the art.

The closing of the main disconnect switch 62 puts power on the auto transformer AT through wire 67, wire 68 and wire 69. Wires 70, 71 and 72 lead from the transformer AT to the three contacts on one side of the normally open contactor CR1 which effects the slow constant non-working speed of the motor 17 preparatory to terminating said non-working speed and applying the brake to stop the motor and the work spindle in a predetermined position.

The wires 59 and 61 are connected to the primary coil of a transformer T by the wires 73 and 74. The brake solenoid B is connected to the wires 73 and 74 by wires 75 and 76. The control circuits for the contactors hereinbefore referred to are operated at a reduced voltage and are electrically connected to the secondary of the transformer T. Wires 77 and 78 are connected to the secondary of the transformer T. The wires 77 and 78 are interconnected by a wire 79 in which is located the fwd contacts of the forward and reverse switch 56 and also the contactor coil F for the forward contactor 55 of the motor circuit. A wire 80 interconnects the wire 79 with the wire 78 and a relay coil FR is located in the wire 80 and which controls switches later to be referred to. The wires 77 and 78 are interconnected by a wire 81 in which are the reverse contacts of the forward and reverse switch 56 and also the contactor coil R for operating the reverse contactor 57 of the motor circuit. The wire 81 is connected with the wire 78 by a wire 82 and in which is the relay coil RR, the purpose of which will later be explained. The wires 77 and 78 are also interconnected by wire 83 in which are the high contacts of the high and low switch 54 and the contactor coil H for operating the high speed contactor 64 of the motor circuit. The wire 84 extending between the wires 77 and 78 contains the low contacts of the high and low switch 54 and also the contactor coil L for operating the low speed contactor 63 of the motor circuit. The wires 77 and 78 are interconnected by a wire 85 in which is the switch LS1 that is actuated by the arm 34 of the rod 26. In addition, the wire 85 contains the contactor coil CR1 which actuates certain switches later to be referred to. The wire 85 also is connected to the wire 78 by a wire 86 in which is the relay coil CR2 which actuates certain other switches later to be referred to. The wires 77 and 78 are interconnected by a wire 87 in which is the spindle positioning switch 58 and the solenoid PS, which when energized raises the rod 26 into contact with the cam ring 19, as previously explained.

Assuming that the main disconnect switch 62 is closed and that the stop button 52 of the start and stop switch S is pushed in, then the contacts of the start and stop switch in the wire 88 are closed and the brake solenoid B is energized. The brake is now held in released position and the spindle is free to be rotated if it is desired to do so, for the purpose of mounting a work holding fixture or chuck thereon.

Assuming that a work holding fixture has been mounted on the work spindle, the cam ring 19 is rotated to the desired position in which the spindle should be stopped, at which time the cam portion 21 of the ring will be in the position shown in Fig. 5, wherein the rod 26 is depressed and the switch LS1 is open. Assuming that the cam ring 19 has been secured in the desired position and that a work piece is mounted in the work holding fixture or chuck on the work spindle, the operator presses the start button 51 inwardly and closes the start contacts in the wire 77 to put current on the control circuits. The closing of the start contacts automatically opens the stop contacts in the wire 88, it being recalled that the start and stop switches are mechanically interlocked. The opening of the stop contacts in the wire 88 deenergizes the brake solenoid B and the brake is applied by the spring 44. Assuming the operator wishes to select a forward operation of the spindle, he turns the forward and reverse switch 56 to forward position, which closes the forward contacts in the wire 79, energizes the contactor coil F, which closes the forward contactor 55 in the motor circuit and opens the normally closed switches F in the wires 81 and 85. Also the relay coil FR in the wire 80 is energized, whereupon the normally open switch FR electrically connected to the wire 75 in the brake circuit is closed and the brake solenoid B is energized and the brake released. Simultaneously the normally closed switch FR in wire 87 of the spindle positioning circuit is opened by the energization of the relay coil FR.

The operator now turns the high low control 54 to high position, whereupon the high contacts in wire 83 are closed and the contactor coil H is energized, which results in the high contactor 64 of the motor circuit being closed and the normally closed contact H in wire 84 of the low speed control circuit being opened. The motor 17 is now operating in the forward direction at high speed. When the operator turns the control for the spindle positioning switch 58 in wire 87 to "on" position the solenoid PS in said wire is not energized since the normally closed switch FR in this circuit was opened when the relay coil FR was energized, as above explained.

The control circuit includes a plugging switch 89 of the permanent magnetic type which is operatively associated with the motor 17 and as is usual in plugging switches includes a movable contact arm 90 which moves under centrifugal force into engagement with either contact R or contact F of the plugging switch, depending upon the direction of rotation of the motor. The plugging switch 89 is a commercially available item well known in the art and is not part of the invention per se and therefore need only be illustrated diagrammatically herein. The contact R of the plugging switch is electrically connected to wire 79 of the forward control circuit, while the contact F is electrically connected to wire 81 of the reverse control circuit. The movable contact arm 90 of the plugging switch is electrically connected by a wire 91 to the wire 77 and said wire 91 includes in its circuit normally open contacts FR and RR arranged in parallel. It being recalled that the motor 17 and the work spindle 12 are operating in the forward direction at high speed, it will be seen that the contact arm 90 of the plugging switch moves into engagement with the contact F thereof, and hence the wire 91 is electrically connected to the wire 81 and the wire 82. When the relay coil FR was energized upon the closing of the forward contacts of the forward and reverse switch 56 the normally open contact FR in the wire 91 was closed. It will be recalled that the normally closed contact F in wire 81 was opened when contactor coil F was energized upon the closing of the forward switch and hence the contactor coil R in wire 81 is not energized when said wire is connected through the plugging switch to the wire 91. However, the relay coil RR in wire 82 is energized at this time by the action of the plugging switch and said energization closes the normally open contact RR in wire 91 and the normally open contact RR in wire 75 in the brake circuit and opens normally closed contact RR in wire 87.

Assuming that the work piece has been machined and the operator wishes to stop the spindle for the purpose of unloading the finished work piece, he turns the forward and reverse control 56 to the "off" position from the forward position, thus opening the forward contacts in wire 79. As soon as the forward contacts in wire 79 are open contactor coil F and relay coil FR in wire 80 are deenergized, whereupon normally closed contacts F in wires 81 and 85 close while normally open contacts FR in the brake circuit and in the circuit to the plugging switch open and the normally closed contact FR in wire 87 closes. However, the motor is still coasting at high speed in the forward direction so that contact arm 90 of the plugging switch 89 is still in engagement with the contact F and therefore wires 81 and 82 remain connected to wire 91 and since relay coil RR in wire 82 is still energized normally open contacts RR in the brake circuit and in wire 91 remain closed. Therefore contactor coil R in wire 81 is energized through the plugging switch, with the result that reverse motor contactor 57 is closed and the motor while coasting in the forward direction will receive current for reverse rotation and this acts to rapidly decelerate the forward coasting of the motor to such speed that the contact arm 90 of the plugging switch 89 moves out of engagement with the contact F, whereupon the contactor coil R and the relay coil RR are deenergized, with the result that reverse contactor 57 of the motor circuit is opened, normally open contact RR in the brake circuit and in wire 91 are opened and normally closed contact RR in wire 87 is closed.

The deenergization of contactor coil R, as just referred to, results in normally closed contacts R in wires 85 and 79 closing, it being recalled that the spindle positioning switch 58 has been closed by the operator and that normally closed contacts FR and RR in wire 87 are now closed due to the deenergization of relay coils FR and RR as referred to above, and then solenoid PS is energized and the lever 36 is rocked to move the rod 26 into contact with the cam ring 19, that is the rod 26 is moved from the position shown in Fig. 2 to the position shown in Fig. 3 and at such time the limit switch LS1 in wire 85 is closed by the arm 34 carried by the rod 26. The closing of the limit switch LS1 energizes contactor coil CR1 in wire 85 and relay CR2 in wire 86, whereupon contact CR1 in wire 75 is closed and the brake held released while contacts CR1 in the motor circuit are closed and therefore low voltage current is imparted to the motor 17 from the transformer AT through the closed contacts CR1 and through the low speed contactor 63 of the motor circuit which was closed by the energization of relay coil CR2 that resulted in closing normally open CR2 contact in wire 84, thus energizing contactor coil L which closes low speed contactor 63 of the motor circuit. The energization of relay coil CR2 also opened normally closed contact CR2 in wire 83 as an interlock against high speed operation.

The spindle 12 is now rotating at the slow positive non-working speed and as soon as the high point of cam 21 on cam ring 19 engages the roller 29 the rod 26 will be moved from the position shown in Fig. 3 to the position shown in Fig. 5, at which time the normally open switch LS1 is opened, whereupon contactor coil CR1 in wire 85 is deenergized and normally open contact CR1 in wire 75 of the brake circuit is opened and the brake solenoid B is deenergized, with the result that the brake is instantly applied to the drum 18 to stop the rotation of the motor shaft 16 and the rotation of the spindle.

It will be observed that the brake is applied only when the motor shaft 16 is rotating at the slow positive non-working speed, and hence the application of the brake at such time will stop the said motor shaft and the work spindle in a definite and predetermined position the instant the brake is applied.

The work spindle having been stopped in the desired predetermined position, the operator may now unload the finished work piece and load in the chuck or fixture a new work piece which is to be machined. When this has been done he turns the control member of the forward and reverse switch 56 from the "off" or intermediate position to the forward position, thus closing the forward contacts in wire 79, whereupon the motor 17 will again operate to drive the work spindle 12 in the forward direction at high working speed, it being recalled that the closing of the forward contacts releases the brake and otherwise conditions the control circuit as explained above.

Assuming that in addition to performing machining operations on the work piece at the high forward speed it is desired to perform in addition threading operations thereon requiring low forward speed operation and low reverse speed operation, the operator will do the following: At the time of initiating the low forward speed operation the operator will move the control of the high low switch 54 from high position into low position. This causes contactor coil H in wire 83 to be deenergized and contactor coil L in wire 84 to be energized, thus opening high speed contactor 64 of the motor circuit and closing low speed contactor 63 of the motor circuit and, in addition, causing normally closed contact H in wire 84 to close and opening normally closed contact L in wire 83. The machine is now running in the forward direction at low speed. Assuming that it is desired to change to reverse low speed operation of the machine, the operator moves the control of the forward and reverse switch 56 from forward position to reverse position, thus deenergizing contactor coil F and relay coil FR and energizing contactor coil R and relay coil RR, thus opening the forward contactor 55 and closing the reverse contactor 57 of the motor circuit. In addition, the deenergization of the contactor coil F will cause normally closed contacts F in the control circuits to close while deenergization of the relay coil FR will cause normally open contacts FR in the brake circuit and the plugging switch circuit to open and normally closed contacts FR in the control circuits to close. Similarly, the energization of contactor coil R causes the normally closed contacts R in the control circuits to open while the energization of relay coil RR will cause the normally open contacts RR in the brake circuit, the plugging switch circuit and the control circuit to close and the normally closed contacts RR in the control circuit to open. The machine is now operating at slow reverse speed, whereupon the movable contact arm 90 of the plugging switch moves into engagement with contact R thereof so that as soon as the control of the forward and reverse switch 56 is moved to "off" position the plugging switch functions to apply reverse (in this instance, forward) current to the direction of rotation of the motor to slow down said motor, after which the slow positive drive is applied to the motor in the forward direction, i. e., a reverse direction to the direction of the last working rotation of the motor. After the slow non-working drive is imparted to the motor the brake is applied, as explained above, to stop the motor and the work spindle in a predetermined position.

From the foregoing description it will be seen that the work spindle can be stopped at the end of the machining operation in a definite predetermined position to facilitate the unloading and loading of the work pieces. It will also be noted that since the slow positive non-working drive is first imparted to the work spindle the latter can be uniformly stopped each time in the desired predetermined position. In addition it will be noted that the means for stopping the work spindle in a predetermined position is normally so located that the operative parts thereof are held from operative position during the machining operation and hence do not produce noise and are not subject to wear at such time and are only brought into operative position at the end of the machining operation when it is desired to stop the spindle in a predetermined position.

Although a preferred embodiment of the invention has been illustrated and described herein it will be understood that the invention is susceptible of various modifications and adaptations within the scope of the appended claims.

Having thus described my invention, I claim:

1. In a machine tool, a rotatable spindle, an electric motor for rotating said spindle, a brake for stopping the movement of said motor and spindle, and control means for said motor and brake and including a control circuit, a brake controlling solenoid in said circuit and operatively connected with said brake, motor control contacts in said circuit, motor control switch means in said circuit controlling said contacts to effect energization and deenergization of said motor, a plugging switch in said circuit controlling said contacts and operatively associated with said motor for plugging the speed of said motor to a coasting speed upon deenergization thereof under the action of said motor control switch means, said motor control switch means and said plugging switch also controlling energization and deenergization of said brake controlling solenoid to effect release and application of said brake when said motor is energized or deenergized; in combination, with mechanism operatively associated with said spindle, said motor, said brake and said control means for stopping said spindle in a predetermined position; said mechanism including a control cam carried by said spindle, a movable control element adapted to cooperate with said cam and be moved thereby in one direction, pressure means normally holding said element in an inactive position with respect to said cam, an element moving solenoid in said circuit which when energized moves said element in the opposite direction to an active position with respect to said cam, said element moving solenoid being under the control of said motor control switch means and said plugging switch to be energized upon deenergization of said motor, additional switch means in said circuit operatively associated with said element and closed thereby when said element is moved in said opposite direction by said element moving solenoid to control said brake controlling solenoid to cause release of said brake, said cam acting on said element when said spindle is coasting to move said element in said one direction against the action of said element moving solenoid to open said additional switch means to control said brake controlling solenoid to effect actuation of said brake to stop said predetermined position.

2. In a machine tool, a rotatable spindle, an electric motor for rotating said spindle at a working speed or at a slow non-working speed, a brake for stopping the movement of said motor and spindle, and control means for said motor and brake and including a control circuit having a working speed motor circuit portion and a non-working speed motor circuit portion, a brake controlling solenoid in said control circuit and operatively connected with said brake, working speed contacts and non-working speed contacts controlling respectively said circuit portions, motor control switch means in said circuit controlling the contacts in said working speed motor circuit portion to effect working speed energization and deenergization of said motor, said motor control switch means also controlling energization and deenergization of said brake controlling solenoid to effect release and application of said brake when said motor is energized or deenergized; in combination, with mechanism operatively associated with said spindle, said motor, said brake and said control means for stopping said spindle in a predetermined position; said mechanism including a control cam carried by said spindle, a movable control element adapted to cooperate with said cam and be moved thereby in one direction, pressure means normally holding said element in an inactive position with respect to said cam, an element moving solenoid in said circuit which when energized moves said element in the opposite direction to an active position with respect to said cam, said element moving solenoid being under the control of said motor control switch means to be energized upon termination of a working speed energization of said motor, additional motor control switch means in said circuit in parallel with said first motor control switch means and operatively associated with said element and closed thereby when said element is moved in said opposite direction by said element moving solenoid to effect closing of the contacts in the non-working speed motor circuit portion to energize said motor for slow non-working speed operation, said additional motor control switch means also controlling energization and deenergization of said brake controlling solenoid to effect release and application of said brake during non-working speed energization or deenergization of said motor, said cam acting on said element when said spindle is rotating at said non-working speed to move said element in said one direction to open the said additional motor control switch means to effect non-working speed deenergization of said motor and to control said brake controlling solenoid to effect actuation of said brake to stop said spindle in said predetermined position.

3. In a machine tool, a rotatable spindle, a reversible electric motor for rotating said spindle in opposite directions at a working speed or at a slow non-working speed, a brake for stopping the movement of said motor and spindle, and control means for said motor and brake and including a control circuit having a working speed motor circuit portion and a non-working speed motor circuit portion, a brake controlling solenoid in said control circuit and operatively connected with said brake, working speed contacts and non-working speed contacts controlling respectively said circuit portions, motor control switch means in said circuit controlling the contacts in said working speed motor circuit portion to effect working speed energization and deenergization of said motor, said motor control switch means also controlling energization and deenergization of said brake controlling solenoid to effect release and application of said brake when said motor is energized or deenergized, a plugging switch in said circuit in parallel with said motor control switch means and operatively connected to said motor to impart plugging energization of said motor upon deenergization thereof by said motor control switch means to reduce the speed of rotation of the motor toward the non-working speed rotation thereof; in combination, with mechanism operatively associated with said spindle, said motor, said brake and said control means for stopping said spindle in a predetermined position; said mechanism including a control cam carried by said spindle, a movable control element adapted to cooperate with said cam and be moved thereby in one direction, pressure means normally holding said element in an inactive position with respect to said cam; an element moving solenoid in said circuit, which when energized moves said element in the opposite direction to an active position with respect to said cam, said element moving solenoid being under the control of said motor control switch means and said plugging switch to be energized upon deenergization of said motor by said switch means or by said plugging switch; additional motor control switch means in said circuit in parallel with said first motor control switch means and said plugging switch and operatively associated with said element and closed thereby when said element is moved in said opposite direction by said element moving solenoid to effect closing of the contacts in the non-working speed motor circuit portion to energize said motor for slow non-working speed operation, said additional motor control switch means also controlling energization and deenergization of said brake controlling solenoid to effect release and application of said brake during non-working speed energization or deenergization of said motor, said cam acting on said element when said spindle is rotating at said non-working speed to move said element in said one direction against the action of said element moving solenoid to open the said additional motor control switch means to effect non-working speed deenergization of said motor and to control said brake controlling solenoid to effect actuation of said brake to stop said spindle in said predetermined position.

ROBERT H. CLARK.

REFERENCES CITED

The following references are of record in the file of this patent:

UNITED STATES PATENTS

| Number | Name | Date |
| --- | --- | --- |
| 1,347,751 | McLain | July 27, 1920 |
| 1,619,398 | Bouton | Mar. 1, 1927 |
| 1,719,889 | Kelsey | July 9, 1929 |
| 2,005,663 | Phily | June 18, 1935 |
| 2,155,681 | Price | Apr. 25, 1939 |
| 2,285,517 | Harvey et al. | June 9, 1942 |
| 2,304,360 | Horstkotte | Dec. 8, 1942 |